Feb. 1, 1966 T. F. NOWACZYK 3,232,329
TRACTION DEVICE
Filed July 8, 1964
2 Sheets-Sheet 1
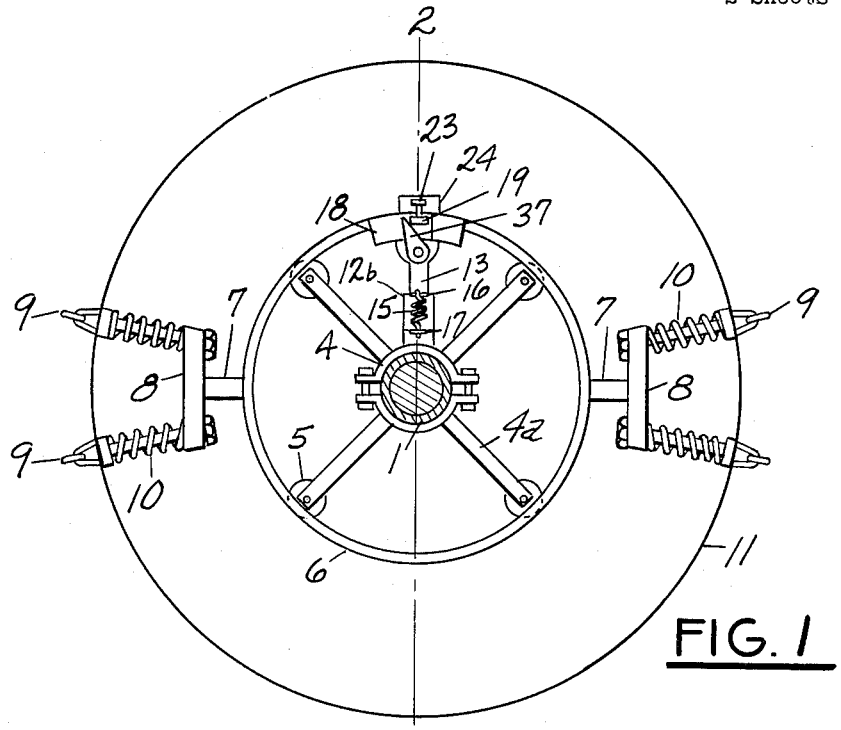
FIG. 1
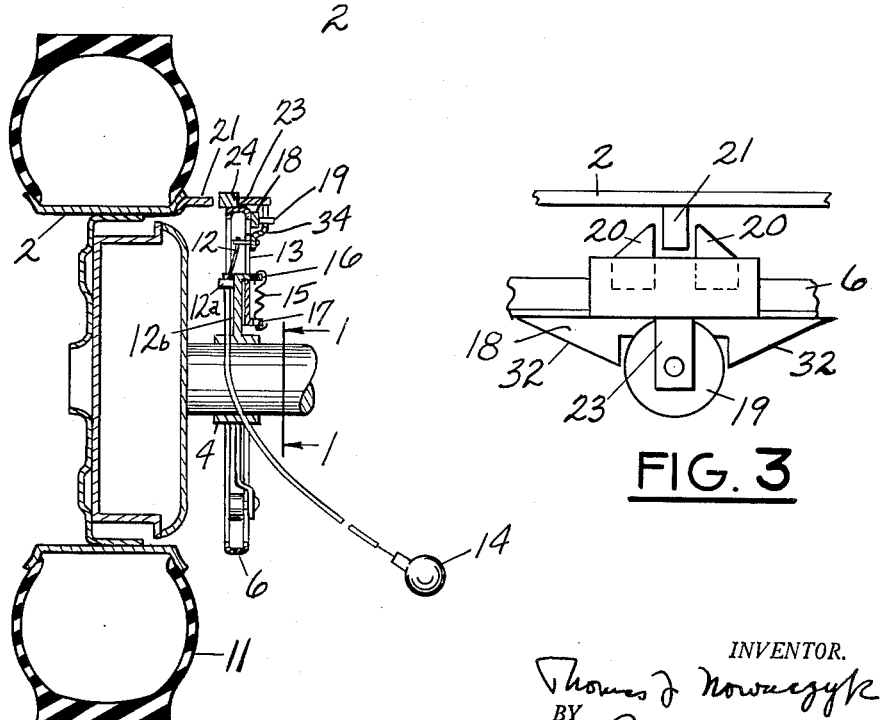
FIG. 2
FIG. 3
INVENTOR.
Thomas J. Nowaczyk
BY
Ralph Hammar
attorney Feb. 1, 1966   T. F. NOWACZYK   3,232,329
TRACTION DEVICE Filed July 8, 1964   2 Sheets-Sheet 2

INVENTOR.
Thomas J Nowaczyk
BY
Ralph Hammar
attorney

United States Patent Office 3,232,329
Patented Feb. 1, 1966

3,232,329
TRACTION DEVICE
Thomas F. Nowaczyk, 744 E. 30th St., Erie, Pa.
Filed July 8, 1964, Ser. No. 381,071
4 Claims. (Cl. 152—214)

This invention is a traction device which can be easily mounted on existing automobiles without interference with the brake lines and which will provide the traction effect of chains without the difficulty of installation and removal. The traction device is mounted on the rear axle inside the rear wheels and is movable into and out of operative position by remote control while the car is in motion.

Figure 4:
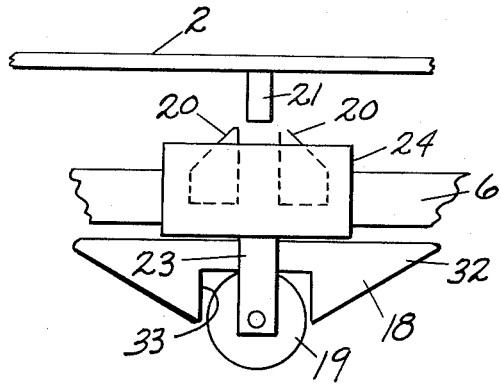
Figure 6:
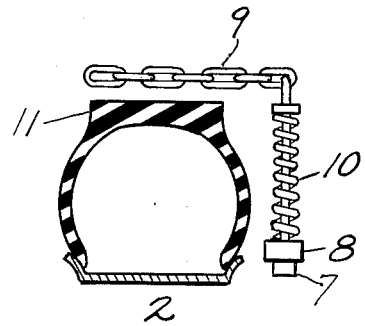
Figure 5:
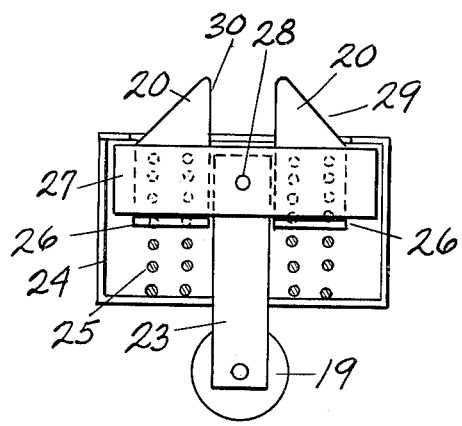
Figure 7:
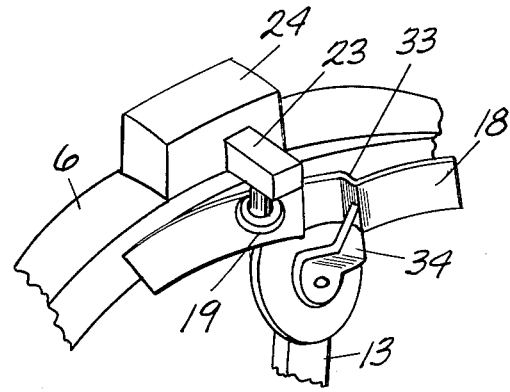

In the drawing, FIG. 1 is a section on line 1—1 of FIG. 2, FIG. 2 is a section on line 2—2 of FIG. 1, FIG. 3 is a fragmentary view showing the clutch between the traction device and the wheel rim in the driving position, FIG. 4 is a fragmentary view showing the clutch between the traction device and the wheel rim in the released position, FIG. 5 is a top plan, partly broken away, of the clutch between the traction device and the wheel rim, FIG. 6 is a detail showing the relation of the traction device to the tire, and FIG. 7 is a fragmentary perspecive of the clutch retracting mechanism.

The traction device has a stationary part mounted on the rear axle 1 between the rear wheel rim 2 and the rear fender housing (not shown). In this location, the traction device is out of the way. The device is easily mounted because automobile rear axles are of relatively standard dimensions and there are relatively standard clearances between the rear side of the wheel rim 2 and the rear fender housing. This means that the traction device can be installed conveniently without modification of existing automobiles.

The stationary part consists of a spider having a split hub 4 and spokes 4a carrying rollers 5 at the outer ends. The split hub is easily bolted to the rear axle, shims being provided, if necessary, to accommodate variations in the outside diameter of the axle. The spokes 4a clear the existing brake operating cable and do not interfere with the operation or servicing of the brakes. Once installed, the spider remains in fixed relation to the rear axle.

Journaled on the rollers 5 is an internally grooved ring 6 carrying two diametrically opposed arms 7 to each of which is fixed a carrier 8 for two traction devices or cleats 9 which may be of any suitable configuration and need not be links fixed to each other as illustrated. Each of the traction devices 9 is independently movable relative to its carrier 8 being biased outward by a coil spring 10 and being free to move inward relative to the carrier. In the non-driving position shown in FIG. 1, the traction devices 9 clear the tire 11. In the driving position when the ring 6 rotates with the tire, the traction devices successively come between the tire and the road and provide the same driving effect as chains. In the driving position, the traction devices 9 between the tire and the road move radially inward, compressing the springs 10 to the desired extent. As soon as the tire and traction devices rotate out of contact with the road, the devices return to the position illustrated in FIG. 6, clearing the tire.

The shifting of the traction device between driving and non-driving positions is controlled by a flexible cable 12 mounted by clamp 12a on arm 12b fixed to the hub 4 and having one end connected to a slide 13 radially guided on arm 12b and having the other end connected to a knob 14. The slide is urged radially outward by a spring 15 arranged between a bracket 16 fixed on the arm 12b and an ear 17 on the slide 13 (FIG. 2). By pulling on the knob 14, the slide 13 is moved radially inward, moving a cam plate 18 clear of a cam roller 19 and permitting clutch members 20 to move axially outward toward he wheel rim 2 and bring the clutch members into operative engagement with a lug 21 fixed to the rim as shown in FIG. 3. Upon release of the knob, the coil spring 15 moves the slide 13 radially outward, moving the cam 18 into the path of roller 19 and pulling the clutch operating rod 23 outward, breaking the connection between the clutch members 20 and the lug or rim clutch member 21.

The construction of the clutches 20 is diagrammatically shown in FIG. 5. The clutches 20 are slidably carried in a clutch housing 24 and are urged toward the rim by coil springs 25 which hold shoulders 26 on the clutch members against a cross bar 27 connected by pin 28 to the clutch operating rod 23. The clutch members 20 are independently movable relative to the cross bar 27 and are free to move inward to the extent permitted by the coil springs 25 but can move outward only to the extent permitted by the engagement of the shoulder 26 with the cross bar. The coil springs 25 urge the clutch members 20 toward the driving or operative position, establishing the connection between the ring 6 and the rim 2. Because the clutches 20 are independently movable, as the rim 2 rotates in either direction, the lug 21 strikes the cam surface 29 on one of the clutch members and cams the clutch member inward while the other clutch member remains out in position to establish a driving connection. As soon as the lug 21 moves past the cam surface 29 on one clutch member, it engages the abrupt or driving surface 30 on the other clutch member.

In the non-driving position, when the clutch operating lever 23 is pulled outward, both of the clutch members 20 are pulled clear of the lug 21. The shifting of the clutch members to the non-driving position is effected by the cam plate 18 which has inclined surfaces 32 cooperating with roller 19 to retract the clutch lever 23 and which has a detent 33 cooperating with the roller 19 to hold the ring 6 in the FIG. 1 or non-driving position. The momentum of the ring 6 is utilized to cam the clutch lever 23 to the non-driving position. If the momentum is insufficient when the slide 13 is first moved outward, subsequent rotation of the wheel will provide the required momentum. A pivoted catch 34 on the slide 13 (FIG. 7) prevents over travel of the roller 19 beyond the detent 33.

In use, the clutches 20 are normally retracted as in FIG. 4 and the ring 6 is inactive as in FIG. 1. By pulling on the knob 14, the slide 13 is moved radially inward and the clutch members are moved outward by springs 25 to the FIG. 3 position establishing a driving connection to the lug 21 on the rim 2. The ring 6 and the traction devices 9 now rotate in unison and provide extra traction. As soon as the extra traction is no longer needed, the knob 14 is released (or pushed inward) and the slide 13 is moved radially outward by spring 15 bringing the cam plate 18 into the path of roller 19 and causing retraction of the clutches 20 to the FIG. 4 position.

The traction device is used only when necessary, such as on unplowed roads or driveways. At all other times, it is retracted.

What is claimed as new is:
1. A traction device comprising a stationary part mounted on the rear axle of an automobile between a rear wheel and its fender housing, a rotatable part journaled on said stationary part, a lug on the rim of said rear wheel adjacent said rotatable part, a clutch carried by said rotatable part, a plurality of traction members mounted on said rotatable part and projecting axially over the tread of the tire of said wheel, said traction members being free to move radially inward and being angularly spaced from each other to provide a plurality of non-driving positions in which the traction members are clear of the road, a control for moving the clutch into and out of engagement with said lug to make and break a driving connection from the rim to the rotatable part, and detent means for holding the rotatable part in a non-driving position when the driving connection to the lug is broken.

2. A traction device comprising a stationary part mounted on the rear axle of an automobile between a rear wheel and its fender housing, said stationary part having a split hub clamped to said axle and radially projecting spokes carrying rollers, a rotatable part having a ring journaled by said rollers, a lug on the rim of said rear wheel adjacent said rotatable part, a clutch carried by said rotatable part, a plurality of traction members mounted on said rotatable part and projecting axially over the tread of the tire of said wheel, said traction members being free to move radially inward and being angularly spaced from each other to provide a plurality of non-driving positions in which the traction members are clear of the road, a control for moving the clutch into and out of engagement with said lug to make and break a driving connection from the rim to the rotatable part, and detent means for holding the rotatable part in a non-driving position when the driving connection to the lug is broken.

3. A traction device comprising a stationary part mounted on the rear axle of an automobile between a rear wheel and its fender housing, said stationary part having radially projecting spokes, a rotatable part having a ring journaled on the ends of each spoke, a lug on the rim of said rear wheel, a clutch carried by said ring, a plurality of traction members mounted on said ring and projecting axially over the tread of the tire of said wheel, said traction members being free to move radially inward and being angularly spaced from each other to provide a plurality of non-driving positions in which the traction members are clear of the road, a control for moving the clutch into and out of engagement with said lug to make and break a driving connection from the rim to said ring, and detent means for holding the rotatable part in a non-driving position when the driving connection to the lug is broken.

4. A traction device comprising a stationary part mounted on the rear axle of an automobile between a rear wheel and its fender housing, a rotatable part journaled on said stationary part, a lug on the rim of said rear wheel, a clutch carried by said rotatable part having spaced clutch members independently biased toward the lug, the clutch members having adjacent driving faces presented toward each other and spaced to receive the lug therebetween, the clutch members having cam faces remote from each other, a clutch operator for pulling the clutch members away from said lug, a plurality of traction members mounted on said rotatable part and projecting axially over the tread of the tire of said wheel, said traction members being free to move radially inward and being angularly spaced from each other to provide a plurality of non-driving positions in which the traction members are clear of the road, and a control cam cooperating with the clutch operator for moving the clutch members out of engagement with said lug to break a driving connection from the rim to the rotatable part, said cam having detent means for holding the rotatable part in a non-driving position when the driving connection to the lug is broken.

References Cited by the Examiner
UNITED STATES PATENTS

| 2,126,961 | 8/1938 | Hodgkinson | 152—214 |
| 2,720,237 | 10/1955 | Chamberlain | 152—214 |

ARTHUR L. LA POINT, *Primary Examiner.*